(12) United States Patent
Mochizuki

(10) Patent No.: US 9,975,718 B2
(45) Date of Patent: May 22, 2018

(54) SHEET FEED DEVICE, IMAGE FORMING APPARATUS, AND METHOD FOR CONTROLLING SHEET FEED DEVICE

(71) Applicant: KYOCERA Document Solutions Inc., Osaka-shi, Osaka (JP)

(72) Inventor: Masayuki Mochizuki, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 227 days.

(21) Appl. No.: 14/711,653

(22) Filed: May 13, 2015

(65) Prior Publication Data

US 2015/0329304 A1 Nov. 19, 2015

(30) Foreign Application Priority Data

May 14, 2014 (JP) ................................. 2014-100804
May 14, 2014 (JP) ................................. 2014-100805

(51) Int. Cl.
| | |
|---|---|
| *B65H 5/00* | (2006.01) |
| *B65H 7/18* | (2006.01) |
| *B65H 1/28* | (2006.01) |
| *B65H 3/06* | (2006.01) |
| *B65H 3/34* | (2006.01) |
| *B65H 3/44* | (2006.01) |

(Continued)

(52) U.S. Cl.
CPC ............... *B65H 7/18* (2013.01); *B65H 1/266* (2013.01); *B65H 1/28* (2013.01); *B65H 3/06* (2013.01); *B65H 3/0669* (2013.01); *B65H 3/0684* (2013.01); *B65H 3/34* (2013.01); *B65H 3/44* (2013.01); *B65H 5/062* (2013.01); *B65H 5/26* (2013.01); *B65H 7/20* (2013.01); *G06K 15/16* (2013.01); *B65H 2403/721* (2013.01); *B65H 2404/143* (2013.01); *B65H 2404/16* (2013.01); *B65H 2511/415* (2013.01); *B65H 2513/50* (2013.01); *B65H 2801/06* (2013.01)

(58) Field of Classification Search
CPC .......... B65H 2405/332; B65H 2513/51; B65H 2511/40; B65H 5/00; B65H 7/20; B65H 3/443; B65H 7/18; B65H 1/266
USPC ........... 271/114, 117, 118, 10.11, 9.01, 9.02, 271/9.03, 9.04
See application file for complete search history.

(56) References Cited

U.S. PATENT DOCUMENTS

| | | | |
|---|---|---|---|
| 5,709,377 A | 1/1998 | Yoshioka et al. | |
| 7,275,741 B2 * | 10/2007 | Worley | B65H 3/0676 271/117 |

(Continued)

FOREIGN PATENT DOCUMENTS

| | | |
|---|---|---|
| JP | H02182636 A | 7/1990 |
| JP | 08248709 A | 9/1996 |

(Continued)

*Primary Examiner* — Thomas A Morrison
(74) *Attorney, Agent, or Firm* — Alleman Hall Creasman & Tuttle LLP

(57) ABSTRACT

In a case where, for example, a certain sheet feeding operation by one of sheet delivery portions is an operation that continues from a sheet feeding operation by another one of the sheet delivery portions in a sheet feed device, a control portion delays output timing, to a feed clutch, of a control signal for feeding a first one of recording sheets, as compared to output timing of control signals for sequentially feeding a second and the following ones of the recording sheets from the same sheet delivery portion.

4 Claims, 9 Drawing Sheets

(51) Int. Cl.
 *B65H 7/20* (2006.01)
 *B65H 1/26* (2006.01)
 *G06K 15/16* (2006.01)
 *B65H 5/06* (2006.01)
 *B65H 5/26* (2006.01)

(56) References Cited

U.S. PATENT DOCUMENTS

| | | | | |
|---|---|---|---|---|
| 8,672,315 | B2* | 3/2014 | Goto | B65H 5/06 271/9.01 |
| 2009/0014945 | A1 | 1/2009 | Izumichi et al. | |
| 2013/0127107 | A1* | 5/2013 | Goto | B65H 5/06 271/9.01 |

FOREIGN PATENT DOCUMENTS

| | | | |
|---|---|---|---|
| JP | H11263463 | A | 9/1999 |
| JP | 2003176045 | A | 6/2003 |
| JP | 2006027806 | A | 2/2006 |
| JP | 2007230666 | A | 9/2007 |
| JP | 2008230807 | A | 10/2008 |
| JP | 2009018921 | A | 1/2009 |
| JP | 2011195276 | A | 10/2011 |
| JP | 2013130772 | A | 7/2013 |

* cited by examiner

SHEET FEED DEVICE, IMAGE FORMING APPARATUS, AND METHOD FOR CONTROLLING SHEET FEED DEVICE

INCORPORATION BY REFERENCE

This application is based upon and claims the benefit of priority from the corresponding Japanese Patent Applications No. 2014-100804 filed on May 14, 2014 and No. 2014-100805 filed on May 14, 2014, the entire contents of which are incorporated herein by reference.

BACKGROUND

The present disclosure relates to sheet feed devices, image forming apparatuses including the sheet feed devices, and a method for controlling the sheet feed devices.

In general, an image forming apparatus includes a sheet feed device that has: a sheet delivery portion that feeds recording sheets to a conveying path from a sheet receiver such as a sheet cassette (sheet feed cassette) or a manual sheet feed tray; and a control portion that controls the sheet delivery portion. The sheet delivery portion includes a pickup roller that rotates in contact with the recording sheets to feed the recording sheets from the sheet receiver. The sheet cassette is mounted so as to be drawable from a housing. The pickup roller is an example of a sheet feed roller.

Further, a sheet detection sensor that detects the recording sheets is provided in the conveying path in many cases. A timing at which the recording sheet is to be fed to an image forming portion is controlled according to a timing at which the sheet detection sensor performs detection.

Further, it is known that, in a case where the image forming apparatus includes a plurality of the sheet delivery portions, automatic change control is performed. The automatic change control is a control for sequentially feeding a plurality of the recording sheets while automatically selecting, according to a predetermined selection rule, the sheet delivery portion for which a sheet feeding operation is to be performed.

Further, it is known that intervals at which the recording sheets are fed are adjusted according to an actual value of a time in which the recording sheet is conveyed.

SUMMARY

An image forming apparatus according to one aspect of the present disclosure includes a sheet feed device and an image forming portion. The sheet feed device includes: a plurality of sheet receivers; a plurality of sheet delivery portions provided for the sheet receivers, respectively; and a control portion. The plurality of sheet receivers each allow a plurality of recording sheets to be stacked and placed thereon. The plurality of sheet delivery portions each include a pickup roller, a pickup engagement rotating member, a connecting mechanism, and a feed clutch. The pickup roller is pressed against the recording sheets and rotates, to feed each recording sheet from a corresponding one of the sheet receivers. The pickup engagement rotating member is rotatably supported and engages with the pickup roller. The connecting mechanism engages with the pickup engagement rotating member with a clearance in a rotation direction thereof. The feed clutch selectively switches between a state where power is transmitted from a drive portion to the connecting mechanism, and a state where the transmission state is released, according to an inputted control signal. The control portion is configured to output the control signal to the feed clutch at a timing based on occurrence of a feed start event for each recording sheet, to cause a corresponding one of the sheet delivery portions to perform a sheet feeding operation for feeding the recording sheets from a corresponding one of the sheet receivers. In a case where the control portion causes the sheet delivery portion to perform the sheet feeding operation, when the sheet feeding operation is an operation that continues from the sheet feeding operation by another one of the sheet delivery portions, the control portion performs a delay control in which output timing of the control signal for feeding a first one of the recording sheets from the sheet delivery portion is delayed as compared to output timing of the control signals for feeding a second and the following ones of the recording sheets, subsequent to the first one of the recording sheets, from the same sheet delivery portion. The image forming portion forms an image on the recording sheets fed from the sheet delivery portions of the sheet feed device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the drawings. The following embodiments are examples where the present disclosure is embodied, and, by nature, do not limit the technical scope of the present disclosure.

First Embodiment: Schematic Configuration of Image Forming Apparatus 10

Figure 1:
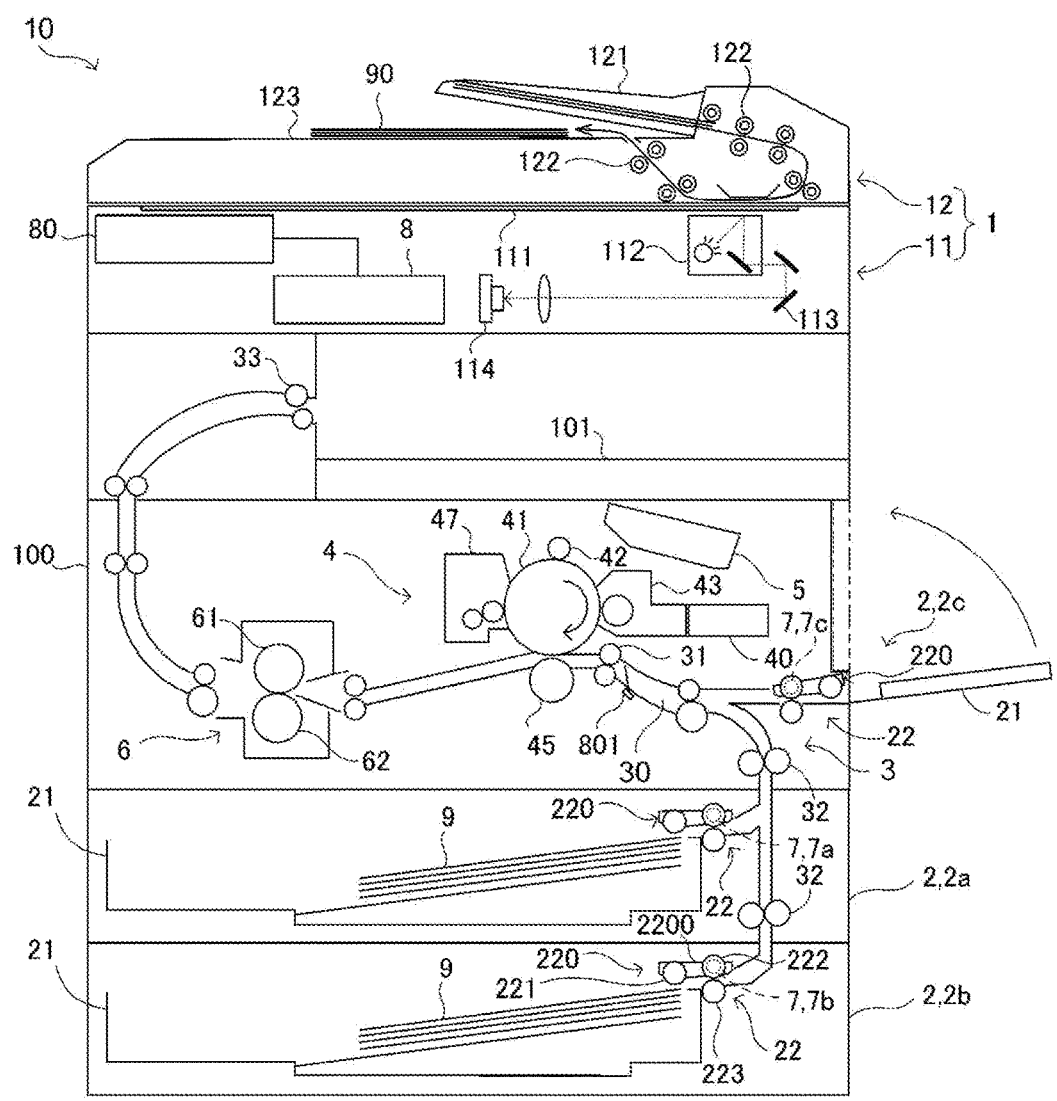
FIG. 1 illustrates a configuration of an image forming apparatus according to an embodiment of the present disclosure.

An image forming apparatus 10 according to a first embodiment of the present disclosure is an image forming apparatus using electrophotography. As shown in FIG. 1, the image forming apparatus 10 includes a plurality of sheet feeding portions 2, a sheet conveying portion 3, an image forming portion 4, a laser scanning portion 5, a fixing portion 6, a sheet detection sensor 801, a control portion 8, and the like.

The image forming apparatus 10 is a multifunction peripheral that includes a document feed reading portion 1 that reads an image from a document 90, and an operation display portion 80. Other examples of the image forming apparatus include printers, copying machines, facsimiles, and the like.

The document feed reading portion 1 includes an image reading portion 11 and an ADF (Auto Document Feeder) 12. The image reading portion 11 includes a document table 111, a reading unit 112, an optical system 113 having mirrors and a lens, a CCD (Charge Coupled Device) 114, and the like.

The document table 111 is a portion provided on an upper surface of the image reading portion 11, and on which a document is placed. The reading unit 112 applies light to the document 90 placed at a reading position on the document table 111, and reflects, toward the optical system 113, light reflected by the document 90. The reading unit 112 is movable in a sub-scanning direction (the left-right direction in FIG. 1). The optical system 113 guides the light reflected by the document 90 toward the CCD 114. The CCD 114 includes: a photoelectric converter that outputs an electrical signal according to an amount of the received light, as image data of the document 90, to the control portion 8; and the like.

The ADF 12 feeds, by driving each of the plurality of feed rollers 122, the document 90 set in a document placement portion 121, through a position at which an image is read by the image reading portion 11, to a sheet discharge tray 123.

Each of the sheet feeding portions 2 includes a sheet receiver 21 and a sheet delivery portion 22. The sheet delivery portion 22 is provided for each sheet receiver 21. A portion, of the image forming apparatus 10, including the plurality of sheet feeding portions 2 and the control portion 8 corresponds to a sheet feed device of the first embodiment.

Figure 2:
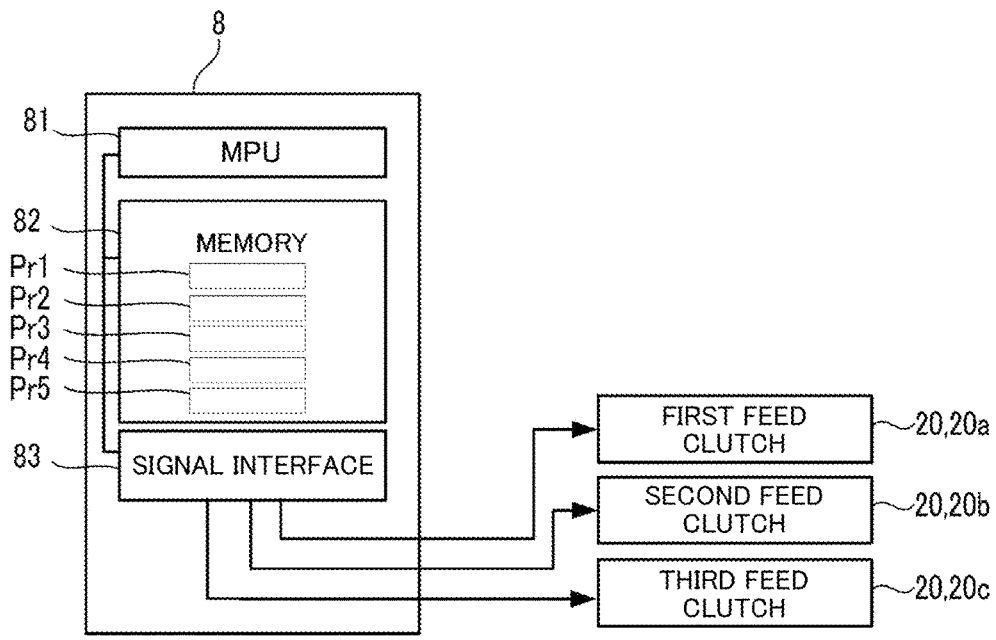
FIG. 2 is a block diagram illustrating devices associated with a sheet feed control in the image forming apparatus according to a first embodiment.

FIGS. 1 and 2 illustrate an exemplary case where the number of the sheet feeding portions 2 provided in the image forming apparatus 10 is three. However, the number of the sheet feeding portions 2 provided in the image forming apparatus 10 may be two, four, or greater than four.

Each sheet receiver 21 is configured such that a plurality of recording sheets 9 can be stacked and placed therein. The recording sheet 9 is a sheet-like medium, such as paper, coated paper, a postcard, an envelope, and an OHP sheet, on which an image is formed.

Each sheet delivery portion 22 includes a pickup roller 221, a sheet feed roller 222, and a retard roller 223. The pickup roller 221 and the sheet feed roller 222, and a movable support portion 2200 that supports the pickup roller 221 and the sheet feed roller 222 form a pickup unit 220. Each sheet delivery portion 22 further includes a feed clutch 20, a connecting mechanism 23, and a pickup engagement rotating member 24.

The pickup roller 221 is pressed against the recording sheets 9 placed on the sheet receiver 21, and rotates. Thus, the pickup roller 221 of the sheet delivery portion 22 feeds the recording sheet 9 from the sheet receiver 21 between the sheet feed roller 222 and the retard roller 223. The pickup roller 221 is pressed against the recording sheets 9 by the movable support portion 2200 rotating toward the sheet receiver 21 side.

Further, the sheet feed roller 222, which is rotating, further feeds, toward the conveying path 30, the recording sheet 9 fed from the pickup roller 221 while nipping the recording sheet 9 between the retard roller 223 and the sheet feed roller 222. The retard roller 223 prevents multi-feeding of the recording sheets 9. The pickup roller 221, the sheet feed roller 222, and the retard roller 223 each have an outer peripheral surface formed of an elastic material such as an elastomer or a rubber.

In the example shown in FIG. 1, a first sheet feeding portion 2a and a second sheet feeding portion 2b among the three sheet feeding portions 2 each include the sheet receiver 21 that is of a cassette type, and is mounted so as to be detachable from a housing 100 (body) of the image forming apparatus 10. The remaining sheet feeding portion, that is, a third sheet feeding portion 2c includes the sheet receiver 21 forming a manual sheet feed tray that can be folded into the housing 100 (body) of the image forming apparatus 10.

In FIG. 2, as the feed clutches 20 for the first sheet feeding portion 2a, the second sheet feeding portion 2b, and the third sheet feeding portion 2c, a first feed clutch 20a, a second feed clutch 20b, and a third feed clutch 20c, respectively, are shown.

Each of the feed clutches 20 is a clutch that selectively switches between a connecting state and a release state according to an inputted control signal. The connecting state is a state where power is transmitted to the connecting mechanism 23 from a drive portion, such as a gear, driven by a motor, and the release state is a state where the transmission state is released. The connecting mechanism 23 and the pickup engagement rotating member 24 will be described below in detail.

The sheet conveying portion 3 includes a registration roller 31, a conveying roller 32, a discharge roller 33, and the like. The registration roller 31 and the conveying roller 32 convey the recording sheet 9 fed from the sheet feeding portion 2, toward the image forming portion 4. Further, the discharge roller 33 discharges the recording sheet 9 on which an image has been formed, through a discharge outlet of the conveying path 30, onto a discharge tray 101.

The sheet detection sensor 801 that detects the recording sheet 9 is provided in the conveying path 30. More specifically, the sheet detection sensor 801 is provided at a position upstream of a position of the registration roller 31 in a direction in which the recording sheet 9 is conveyed. The sheet detection sensor 801 detects that the recording sheet 9 fed from each sheet feeding portion 2 has reached a position just before the registration roller 31 in the conveying path 30.

Further, the control portion 8 controls whether the registration roller 31 is to stop or rotate, according to a timing when the sheet detection sensor 801 detects the recording sheet 9. Thus, a timing at which the recording sheet 9 is to be fed to the image forming portion 4 is adjusted.

The image forming portion 4 forms an image on a surface of the recording sheet 9 that is fed from the sheet delivery portion 22, and travels in the conveying path 30. The image forming portion 4 includes a drum-like photosensitive member 41, a charging portion 42, a developing portion 43, a transfer portion 45, a cleaning portion 47, and the like. The photosensitive member 41 is an exemplary image carrier.

The photosensitive member 41 rotates, and the surface of the photosensitive member 41 is uniformly charged by the charging portion 42. Further, an electrostatic latent image is written on the surface of the photosensitive member 41 that has been charged, by scanning of laser light by the laser scanning portion 5, and the electrostatic latent image is developed into a toner image by toner being supplied to the photosensitive member 41 by the developing portion 43. The toner is supplied from a toner container 40 to the developing portion.

Further, the transfer portion 45 transfers the toner image on the photosensitive member 41, to the recording sheet 9 that is traveling in the conveying path 30. Finally, the cleaning portion 47 eliminates the toner remaining on the surface of the photosensitive member 41.

The fixing portion 6 nips the recording sheet 9 having the toner image formed thereon, between a pressure roller 62 and a fixing roller 61 having a heater such as a halogen heater incorporated therein, and feeds the recording sheet 9 to the following process step. Thus, the fixing portion 6 heats the toner image (image) on the recording sheet 9, to fix the image on the recording sheet 9.

The control portion 8 causes the operation display portion 80 to display an operation menu or the like. Further, according to input information that is inputted through the operation display portion 80, and detection results from various sensors including the sheet detection sensor 801, the control portion 8 controls various electric devices including the feed clutch 20. For example, as shown in FIG. 2, the control portion 8 includes an MPU (Micro Processor Unit) 81, a memory 82, and a signal interface 83.

The MPU 81 is a processor that performs various calculations. The memory 82 is a nonvolatile storage portion in which information, such as control programs Pr1, Pr2, Pr3, Pr4, Pr5, which causes the MPU 81 to perform various processes is previously stored. Further, the memory 82 is also a storage portion into which and from which various information can be written and read by the MPU 81.

The control portion 8 comprehensively controls the image forming apparatus 10 by the MPU 81 executing the various control programs Pr1, Pr2, Pr3, Pr4, Pr5 that are previously stored in the memory 82.

The signal interface 83 is an interface circuit that acts as a relay that allows transmission and reception of signals between the MPU 81, and sensors and devices to be controlled. The MPU 81 receives detection signals (measurement signals) from the various sensors such as the sheet detection sensor 801, through the signal interface 83. Further, the MPU 81 outputs a control signal through the signal interface 83 to devices, such as the feed clutch 20, to be controlled.

[Details of Sheet Delivery Portion 22]

Figure 3:
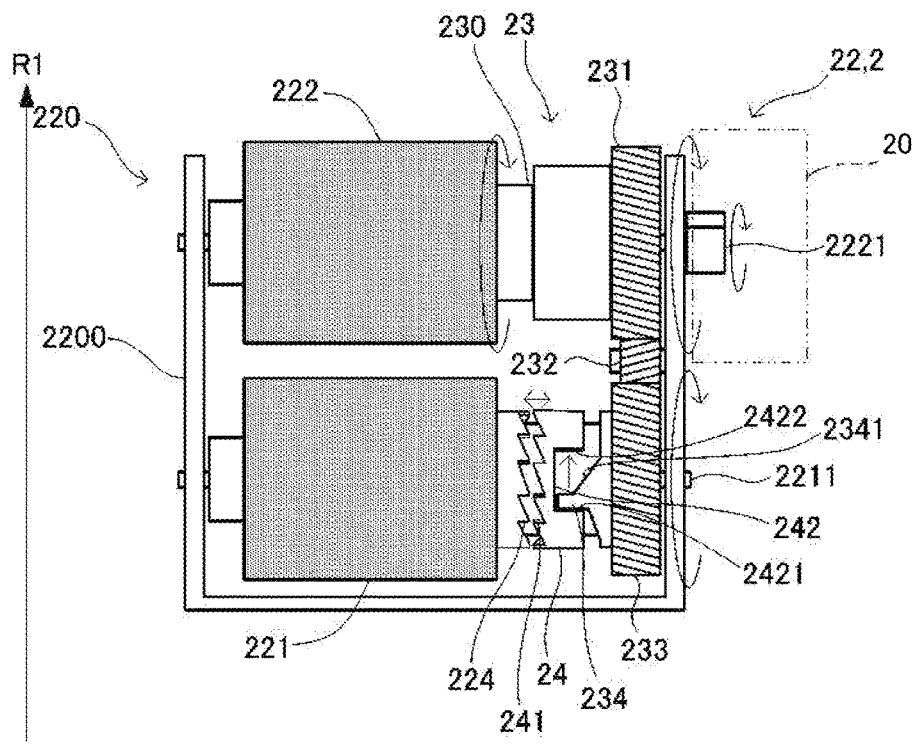
FIG. 3 is a first bottom view of a pickup unit of the image forming apparatus according to the first embodiment.
Figure 4:
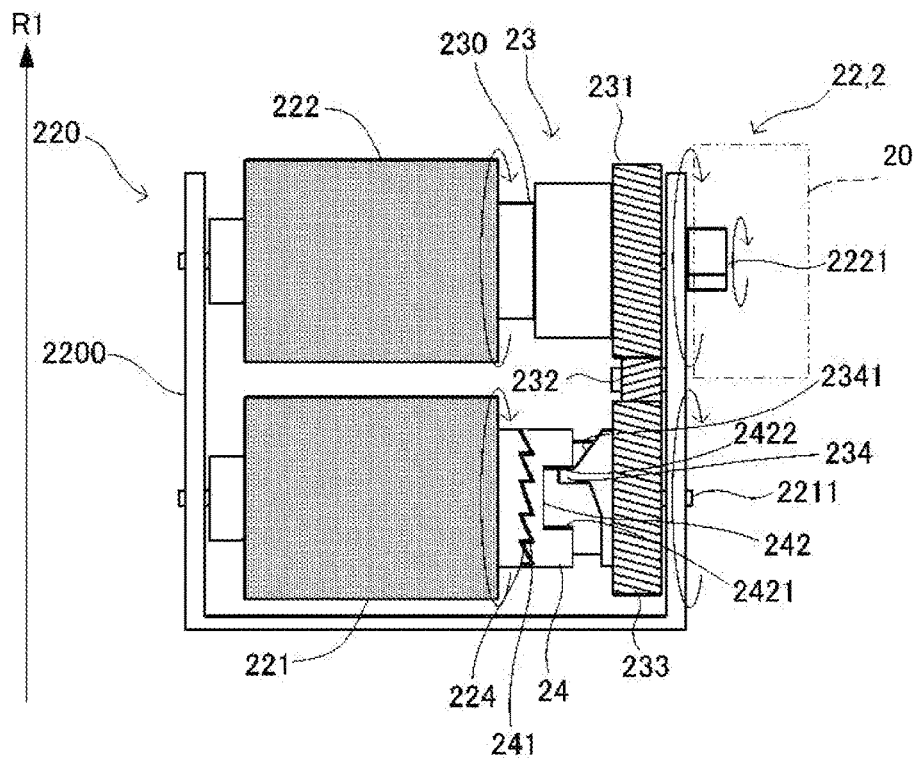
FIG. 4 is a second bottom view of the pickup unit of the image forming apparatus according to the first embodiment.

Subsequently, the sheet delivery portion 22 will be described in detail with reference to FIGS. 3 and 4. FIGS. 3 and 4 are bottom views illustrating the pickup unit 220 in different states, respectively.

The pickup unit 220 includes, in addition to the pickup roller 221, the sheet feed roller 222, and the movable support portion 2200, the connecting mechanism 23 and the pickup engagement rotating member 24.

The pickup engagement rotating member 24 is a member that is supported so as to be rotatable around the rotation center line of the pickup roller 221. The pickup engagement rotating member 24 is engageable with the connecting mechanism 23 and the pickup roller 221. The connecting mechanism 23 is a mechanism that transmits power from the feed clutch 20, to the sheet feed roller 222 and the pickup engagement rotating member 24. In FIGS. 3 and 4, the feed clutch 20 is indicated by an imaginary line (alternate long and two short dashes line).

The feed clutch 20 is a clutch that selectively switches between a state where power is transmitted from the not-illustrated drive portion to a rotation shaft 2221 of the sheet feed roller 222, and a state where the transmission state is released.

The connecting mechanism 23 includes a one-way clutch 230, a first gear 231, a second gear 232, and a third gear 233. The one-way clutch 230 and the first gear 231 are mounted to the rotation shaft 2221 of the sheet feed roller 222. The third gear 233 is mounted to a rotation shaft 2211 of the pickup roller 221. The first gear 231 meshes with the second gear 232, and the second gear 232 meshes with the third gear 233.

Hereinafter, a direction in which the pickup roller 221 and the sheet feed roller 222 rotate in order to feed the recording sheet 9 is represented as a forward direction. The opposite rotation direction is represented as a backward direction. A direction R1 indicated by a straight line with an arrow in the drawings, represents a direction in which the recording sheet 9 travels.

When the feed clutch 20 enters the connecting state, the one-way clutch 230 and the first gear 231 rotate in the forward direction. Further, the sheet feed roller 222 rotates in the forward direction in conjunction with the one-way clutch 230. Further, the second gear 232 rotates in conjunction with the first gear 231, whereby the third gear 233 also rotates in the forward direction. The third gear 233 has an extension 234 that extends along the rotation shaft 2211.

An end face of the extension 234 on the downstream side in the forward rotation direction forms a tapered surface 2341 that is tilted such that the extension 234 is gradually expanded from the end side toward the base side.

The pickup roller 221 and the pickup engagement rotating member 24 are supported so as to be rotatable relative to the rotation shaft 2211. The pickup engagement rotating member 24 includes a recess 242 by which the extension 234 is caught (with which the extension 234 engages), and a first saw-teeth-shaped gear 241 disposed on a side opposite to the recess 242 side. Further, the pickup roller 221 has a second saw-teeth-shaped gear 224 that meshes (engages) with the first saw-teeth-shaped gear 241.

In the recess 242 of the pickup engagement rotating member 24, an edge on the upstream side in the forward rotation direction is referred to as an upstream-side edge 2421, and an edge on the downstream side in the forward rotation direction is referred to as a downstream-side edge 2422.

A width of the recess 242 in the circumferential direction of the pickup engagement rotating member 24 is set so as to be sufficiently greater than a width of the extension 234. Therefore, the extension 234 of the third gear 233 engages with the recess 242 of the pickup engagement rotating member 24 with a clearance in the rotation direction. That is, the connecting mechanism 23 engages with the pickup engagement rotating member 24 with a clearance in its rotation direction.

The feed clutch 20 transmits power (rotational force) to the connecting mechanism 23, the connecting mechanism 23 transmits power to the sheet feed roller 222 and the pickup engagement rotating member 24, and the pickup engagement rotating member 24 transmits power to the pickup roller 221. Thus, when the feed clutch 20 enters the connecting state, the sheet feed roller 222 and the pickup roller 221 rotate in the forward direction.

FIG. 3 shows a state where the extension 234 is positioned so as to be closest to the upstream-side edge 2421 in the recess 242, and FIG. 4 shows a state where the extension 234 is positioned so as to be closest to the downstream-side edge 2422 in the recess 242.

Further, the pickup engagement rotating member 24 is supported so as to be slidable in the direction along the rotation shaft 2211 between the third gear 233 and the second saw-teeth-shaped gear 224. FIG. 3 shows a state where the pickup engagement rotating member 24 is positioned so as to be closest to the third gear 233, and the first saw-teeth-shaped gear 241 and the second saw-teeth-shaped gear 224 do not mesh with each other. On the other hand, FIG. 4 shows a state where the pickup engagement rotating member 24 is positioned so as to be closest to the second saw-teeth-shaped gear 224, and the first saw-teeth-shaped gear 241 and the second saw-teeth-shaped gear 224 mesh with each other.

[Details of Movement of Pickup Unit 220]

Next, movement of the pickup unit 220 in the case of the sheet feeding portion 2 performing a sheet feeding operation for feeding the recording sheet 9 from the sheet receiver 21 will be described in detail with reference to FIGS. 5 to 9. To date, the phenomenon described below has not been clearly recognized. The phenomenon is clearly recognized for the first time from various experiments.

Figure 5:
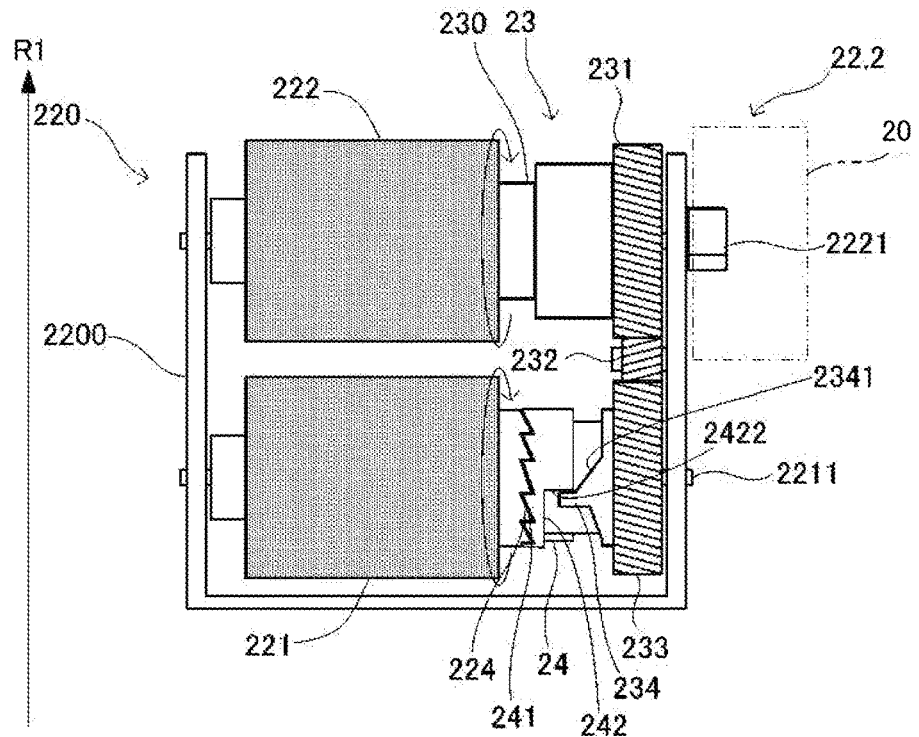
FIG. 5 is a third bottom view of the pickup unit of the image forming apparatus according to the first embodiment.

As shown in FIG. 5, when the feed clutch 20 is in the connecting state (ON state), the connecting mechanism 23 transmits forward direction rotational force to the sheet feed roller 222 and the third gear 233. At this time, by the third gear 233 rotating in the forward direction, the tapered surface 2341 of the extension 234 contacts with the downstream-side edge 2422 of the recess 242 of the pickup engagement rotating member 24. Therefore, the downstream-side edge 2422 slides on the tapered surface 2341, and the pickup engagement rotating member 24 shifts to the second saw-teeth-shaped gear 224 side. Thus, the first saw-teeth-shaped gear 241 and the second saw-teeth-shaped gear 224 mesh with each other, and the pickup roller 221 rotates in the forward direction in conjunction with the rotation of the pickup engagement rotating member 24.

That is, when the feed clutch 20 enters the connecting state (ON state), the connecting mechanism 23 transmits power, and thus the sheet feed roller 222 and the pickup roller 221 rotate in the forward direction, to feed the recording sheet 9 from the sheet receiver 21. This operation is the sheet feeding operation. The control portion 8 outputs the control signal to each feed clutch 20, at a timing based on a feed start event that occurs each time the recording sheet 9 needs to be fed. Thus, the control portion 8 causes each sheet delivery portion 22 to perform the sheet feeding operation.

When the sheet feeding portion 2 is performing the sheet feeding operation, the elastic member forming the outer peripheral surface of the retard roller 223 is elastically deformed due to an attracting force (frictional force), from the recording sheet 9, in the traveling direction R1 of the recording sheet 9.

The one-way clutch 230 limits rotation of the sheet feed roller 222 in the backward direction, while the one-way clutch 230 does not limit the rotation of the sheet feed roller 222 in the forward direction. Further, when the pickup engagement rotating member 24 rotates in the forward direction, the first saw-teeth-shaped gear 241 meshes with the second saw-teeth-shaped gear 224, while the first saw-teeth-shaped gear 241 does not limit rotation of the pickup roller 221 in the forward direction. Therefore, the sheet feed roller 222 and the pickup roller 221 are constantly rotatable in the forward direction.

Therefore, also in a state where the feed clutch 20 enters the release state (OFF state), and the connecting mechanism 23 stops, the sheet feed roller 222 and the pickup roller 221 are rotatable only in the forward direction in the case of an external force being applied.

Figure 6:
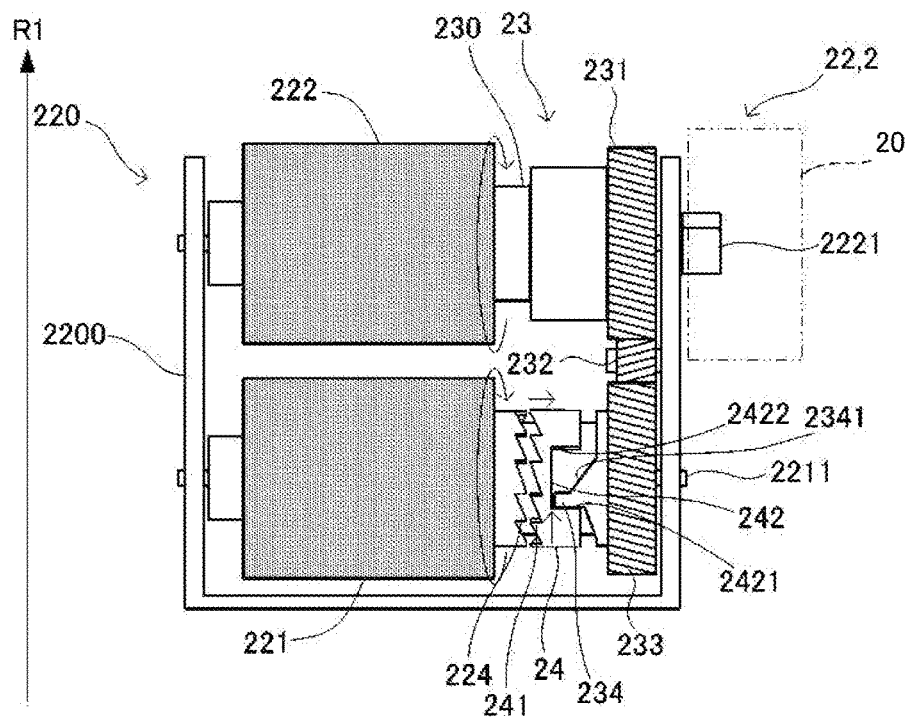
FIG. 6 is a fourth bottom view of the pickup unit of the image forming apparatus according to the first embodiment.

As shown in FIG. 6, when the feed clutch 20 enters the release state, and the sheet feeding operation ends, the pickup roller 221 and the sheet feed roller 222 continue to rotate in the forward direction due to inertia, or force applied from the recording sheet 9 that is conveyed by the sheet conveying portion 3, and thereafter the pickup roller 221 and the sheet feed roller 222 stop. Thus, force for rotating the first saw-teeth-shaped gear 241 in the forward direction and force for shifting the first saw-teeth-shaped gear 241 toward the third gear 233 are applied from the second saw-teeth-shaped gear 224 to the first saw-teeth-shaped gear 241. Therefore, meshing of the first saw-teeth-shaped gear 241 and the second saw-teeth-shaped gear 224 with each other is released, and the upstream-side edge 2421 of the recess 242 approaches the extension 234. Hereinafter, this state is referred to as a state immediately after releasing of connection.

Figure 7:
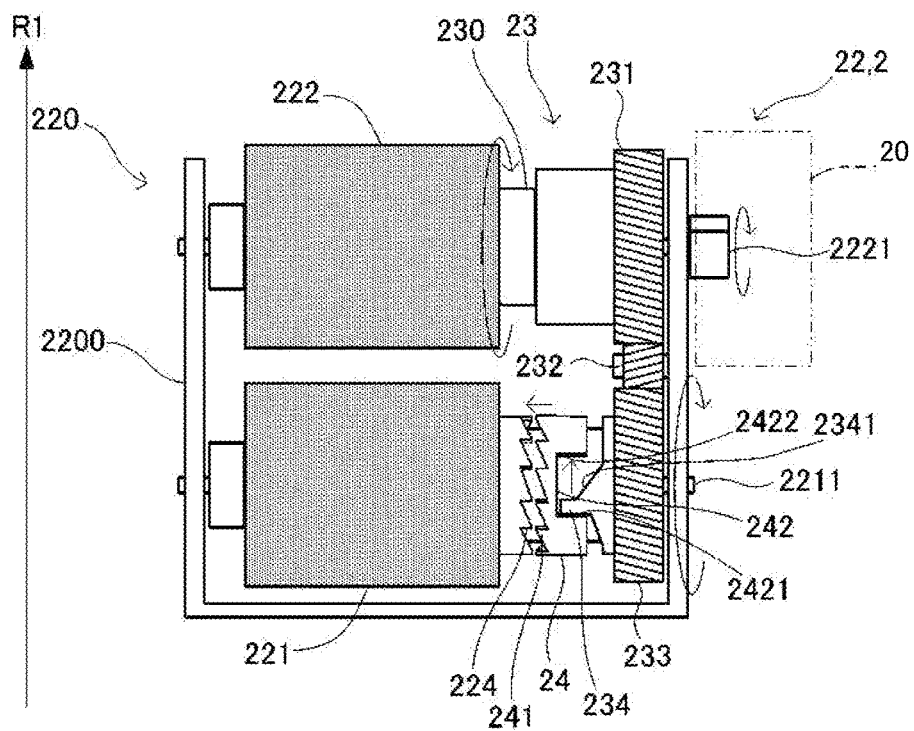
FIG. 7 is a fifth bottom view of the pickup unit of the image forming apparatus according to the first embodiment.

FIG. 7 shows a state of the pickup unit 220 in the case of the feed clutch 20 entering the connecting state after very little time from the state immediately after releasing of connection. In this case, the extension 234 starts to rotate in the forward direction from the position on the upstream-side edge 2421 side in the recess 242.

Therefore, when a time during which the extension 234 rotates over a distance corresponding to the clearance of the recess 242 elapses after the feed clutch 20 has entered the connecting state, the pickup roller 221 starts rotating. The time during which the extension 234 rotates over the distance corresponding to the clearance of the recess 242 is a time required for the extension 234 to rotate, from the position on the upstream-side edge 2421 side in the recess 242, to a position at which the extension 234 contacts with the downstream-side edge 2422.

Figure 8:
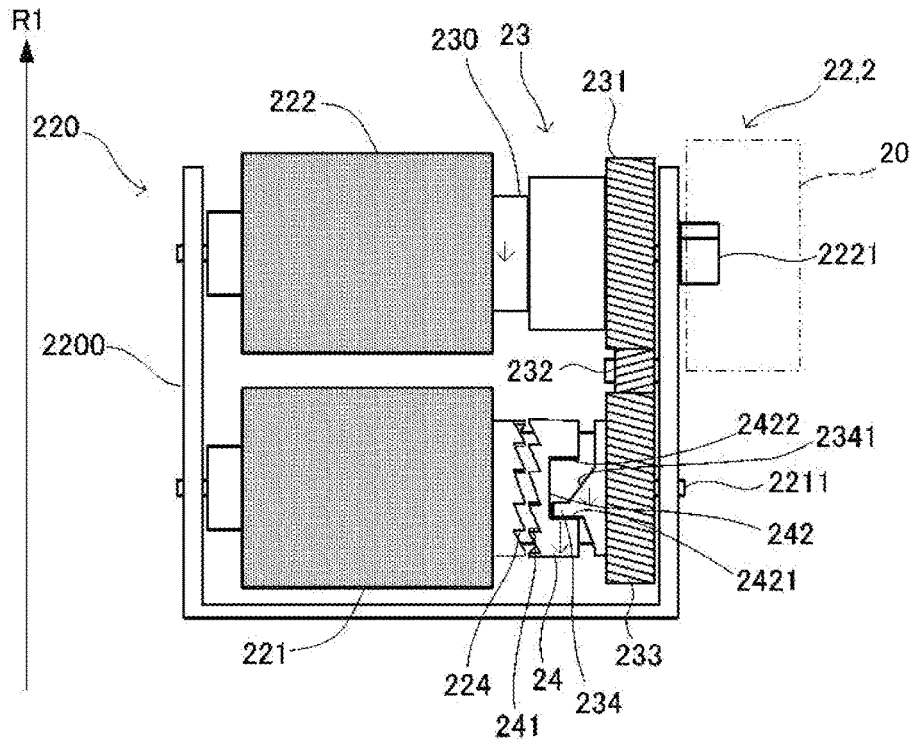
FIG. 8 is a sixth bottom view of the pickup unit of the image forming apparatus according to the first embodiment.
Figure 9:
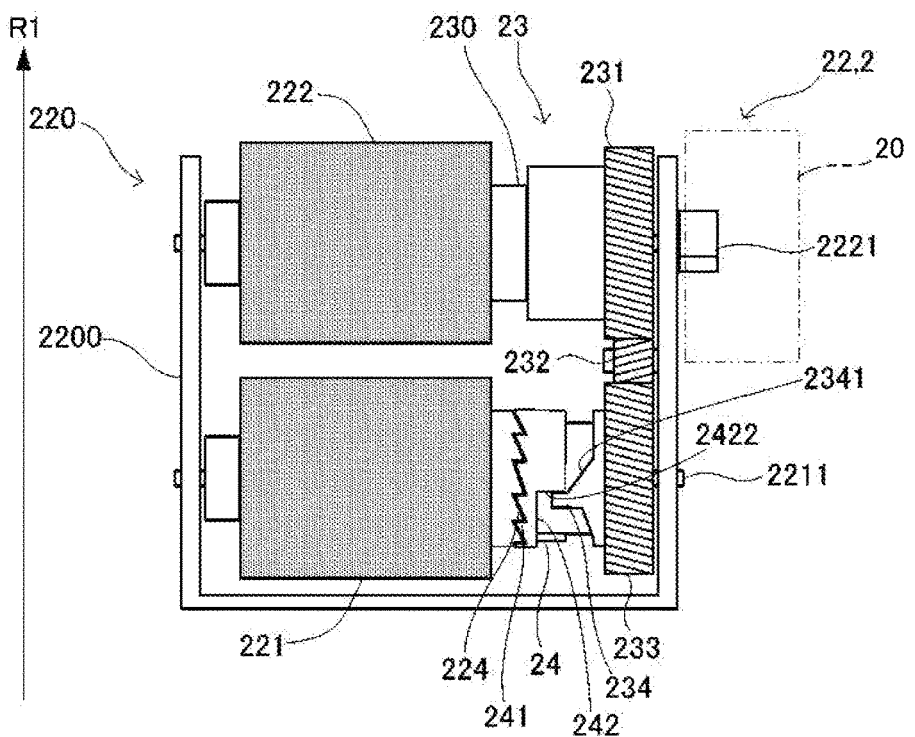
FIG. 9 is a seventh bottom view of the pickup unit of the image forming apparatus according to the first embodiment.

FIGS. 8 and 9 show a state of the pickup unit 220 in the case of the feed clutch 20 being left in the release state for some time since the state immediately after releasing of connection. In this case, the elastic member forming the outer peripheral surface of the retard roller 223 is restored from a state where the elastic member is elastically deformed in the traveling direction R1 of the recording sheet 9 to a state where the elastic member is at the lower portion. Thus, as shown in FIG. 8, the sheet feed roller 222 that contacts with the retard roller 223 slightly rotates in the backward direction, and the extension 234 slightly rotates in the backward direction in conjunction therewith.

Further, the extension 234 that has slightly rotated in the backward direction pushes the upstream-side edge 2421 of the recess 242 in the backward direction in a repelling manner. Thus, as shown in FIG. 9, the pickup engagement rotating member 24 rotates in the backward direction until the downstream-side edge 2422 of the recess 242 reaches such a position that the downstream-side edge 2422 is caught by the extension 234.

Therefore, when the sheet feeding operation is restarted after a short time period has elapsed since the state immediately after releasing of connection, the pickup roller 221 starts rotating immediately after the feed clutch 20 enters the connecting state.

As described above, in the sheet feed device of the present embodiment, for the connecting mechanism 23 that transmits power from the drive portion, to the pickup roller 221, a clearance in the rotation direction of the pickup roller 221 is provided. In such a sheet feed device, the control portion 8 is likely to start feeding the recording sheet 9 at a given timing based on occurrence of a feed start event for each recording sheet 9.

In the above case, a time when the recording sheet 9 from the sheet receiver 21 reaches the sheet detection sensor 801 may vary due to the clearance. In this case, when the recording sheets 9 are sequentially fed at short time intervals, the recording sheets 9 may reach a position of the sheet detection sensor 801 at time intervals shorter than time intervals at which the sheet detection sensor 801 can perform detection.

Further, in a case where, for example, the time varies due to the clearance only under a specific condition, even when intervals at which the recording sheets are fed are adjusted according to an actual value of a time when the recording sheet is conveyed, occurrence of the variation cannot be prevented.

On the other hand, in the sheet feed device of the present embodiment, the control portion 8 performs a control described below. Thus, even when a clearance in the rotation direction is provided for the connecting mechanism 23 that transmits power from the drive portion, to the pickup roller 221, the recording sheets 9 can be sequentially fed at very short time intervals while occurrence of the variation in time can be prevented.

[Method for Controlling Sheet Feed Device]

Figure 10:
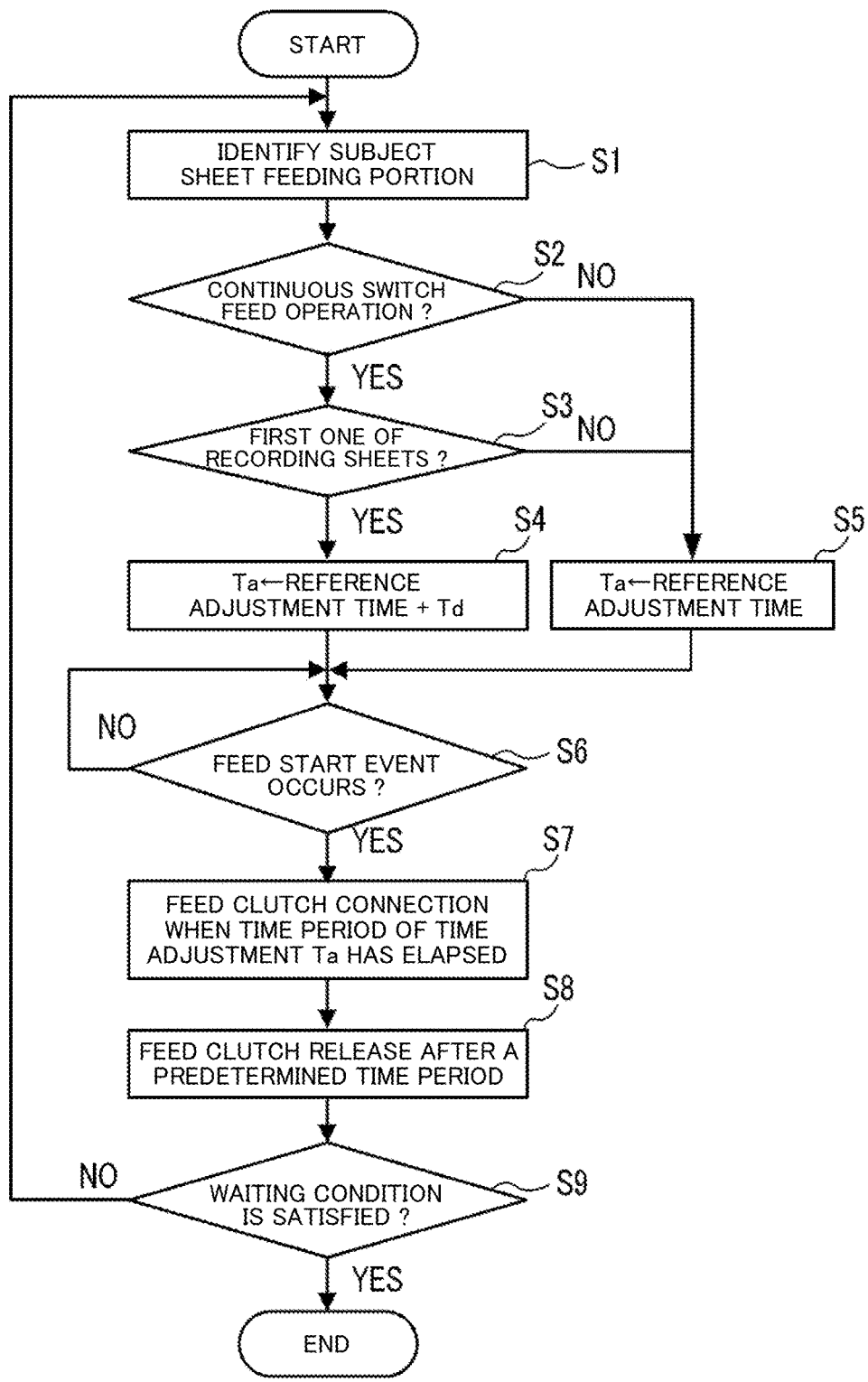
FIG. 10 is a flow chart showing an example of a procedure of the sheet feed control performed by a control portion of the image forming apparatus according to the first embodiment.

Subsequently, an example of a control step, for the sheet feeding portion 2, performed by the control portion 8 in the image forming apparatus 10 will be described with reference to FIG. 10. FIG. 10 is a flow chart showing an example of a procedure of a sheet feeding control process performed by the control portion 8.

The control step is a process step in which the control portion 8 causes each feed clutch 20 to perform the sheet feeding operation for feeding the recording sheet 9 from the sheet receiver 21 to the sheet delivery portion 22. The control portion 8 outputs the control signal at a timing based on the feed start event that occurs each time one of the recording sheets 9 is to be fed.

When, for example, a job for forming an image by the image forming portion 4 is generated, the control portion 8 starts the control step shown in FIG. 10. In the following description, S1, S2, . . . represent specific numbers of the process steps, respectively. The process by the control portion 8 as described below, is performed by the MPU 81 executing the control programs stored in the memory 82.

<Step S1>

Firstly, the control portion 8 identifies, with reference to contents of the job, the sheet feeding portion 2, among the plurality of the sheet feeding portions 2, for which the sheet feeding operation will be started. Step S1 is a step in which the MPU 81 executes an operation determination program Pr1.

<Step S2>

Further, the control portion 8 determines whether or not the sheet feeding operation that will be performed by the sheet feeding portion 2 is a continuous switch feed operation that satisfies a predetermined condition. Step S2 is a step in which the MPU 81 executes the operation determination program Pr1.

When the sheet feeding operation that will be performed by the sheet delivery portion 22 having been identified in step S1 is a continuous operation that continues from the sheet feeding operation by another one of the sheet delivery portions 22, the control portion 8 determines that the continuous switch feed operation is performed. The continuous operation is an operation in which, in a very short predetermined time period from the end of the sheet feeding operation by one of the sheet delivery portions 22, the sheet feeding operation by a different one of the sheet delivery portions 22 is started.

For example, in a case where the job for forming an image is a job involving an automatic change control for the sheet feeding portion 2, the sheet feeding operation is determined as the continuous switch feed operation. The automatic change control is a control for sequentially feeding a plurality of the recording sheets 9 while automatically selecting, according to a predetermined selection rule, the sheet delivery portion 22 for which the sheet feeding operation is to be performed. In this case, in a series of the automatic change control, the sheet feeding operation by the sheet delivery portion 22 which has been selected for the second or the following time, is the continuous switch feed operation.

For example, the automatic change control is a control in which, in a case where it is determined that the recording sheet 9 in the sheet receiver 21 for the sheet delivery portion 22 that has been selected first, becomes absent during the job (sheet remaining amount: 0%), another one of the sheet delivery portions 22 is automatically selected to continue the job.

Further, in a case where a plurality of the documents 90 having different sizes are set in the document placement portion 121 of the ADF 12, the automatic change control may be performed. In this case, the control portion 8 detects a size of each of the documents 90 that are sequentially fed by the ADF 12, according to image data of the documents 90 obtained by the image reading portion 11. The sheet delivery portion 22 of the sheet feeding portion 2 in which the recording sheets 9 having a size corresponding to the size of the document 90 having been detected are set, is selected, as a subject for which the sheet feeding operation is to be performed, by the control portion 8.

Further, also in a case where, while the recording sheets 9 from one of the sheet feeding portions 2 are being sequentially fed for a certain image forming job, a new image forming job using another one of the sheet feeding portions 2 is generated, the sheet feeding operation for the new image forming job is the continuous switch feed operation.

<Step S3>

Further, the control portion 8 determines whether or not the sheet feeding operation that will be performed by the sheet delivery portion 22 having been identified in step S1, is an operation for feeding the first one of the recording sheets 9 in a series of operations by the sheet delivery portion 22. Step S3 is also a step in which the MPU 81 executes the operation determination program Pr1.

<Step S4>

When the sheet feeding operation that will be performed is determined as the continuous switch feed operation and an operation for feeding the first one of the recording sheets 9, the control portion 8 sets, as an adjustment time variable Ta to be used for a control described below, a value representing a time that is longer than a predetermined reference adjustment time by a predetermined delay time Td. Step S4 is a step in which the MPU 81 executes a delay control program Pr2. The reference adjustment time is predefined for each sheet feeding portion 2.

A state where step S4 is to be performed, is a state where a positional relationship between the extension 234 and the recess 242 of the pickup engagement rotating member 24 is as shown in FIG. 9 at the start of the sheet feeding operation. That is, the state where step S4 is to be performed, is a state where the extension 234 is positioned on the downstream-side edge 2422 side in the recess 242.

Further, the delay time Td is a time required for the extension 234 to rotate (shift) over a distance corresponding to the clearance of the recess 242.

<Step S5>

On the other hand, in a case where it is determined that the sheet feeding operation that will be performed is not the continuous switch feed operation, or is not an operation for feeding the first one of the recording sheets 9 (is an operation for feeding the second or the following sheet), the control portion 8 sets, as the adjustment time variable Ta, a value representing the reference adjustment time. Step S5 is a step in which the MPU 81 executes a non-delay control program Pr3.

A state where step S5 is to be performed, is a state where a positional relationship between the extension 234 and the recess 242 of the pickup engagement rotating member 24 is as shown in FIG. 7 at the start of the sheet feeding operation. That is, the state where step S5 is to be performed, is a state where the extension 234 is positioned on the upstream-side edge 2421 side in the recess 242.

<Steps S6 to S8>

The control portion 8 monitors occurrence of the feed start event (S6). Further, the control portion 8 causes the feed clutch 20 for the sheet delivery portion 22 having been identified in step S1 to enter the connecting state when a time represented by the adjustment time variable Ta has elapsed after occurrence of the feed start event (S7). Further, the control portion 8 returns the feed clutch to the release state after elapse of a predetermined time period (S8). The control portion 8 outputs the control signal to the feed clutch 20, to cause the feed clutch 20 to be in the connecting state or the release state.

The feed start event is, for example, an event that a control signal for causing a clutch (not shown) of the registration roller 31 to be in a connecting state (ON state) becomes active (ON).

Each time the control portion 8 performs steps S6 to S8, one of the recording sheets 9 is fed from the sheet receiver 21 toward the conveying path 30. Steps S6 to S8 are steps in which the MPU 81 executes a clutch control signal output program Pr4.

The process steps of steps S1 to S3 performed by the control portion 8 represent an example of a determination step. The determination step is a process step in which it is determined, when the control portion 8 causes the sheet delivery portion 22 to perform the sheet feeding operation, whether or not the sheet feeding operation is the continuous switch feed operation that continues from the sheet feeding operation performed by another one of the sheet delivery portions 22.

Further, the process steps of steps S4 to S8 performed by the control portion 8 represent an example of a delay control step. The delay control step is a process step in which, in a case where the result of the determination step represents the continuous switch feed operation, output timing of the control signal for feeding the first one of the recording sheets 9 from the sheet delivery portion 22 is delayed as compared to output timing of the control signals for feeding the second and the following ones of the recording sheets 9, subsequent to the first one of the recording sheets 9, from the same sheet delivery portion 22.

<Step S9>

Next, the control portion 8 determines whether or not a predetermined waiting condition is satisfied. The waiting condition is, for example, a condition in which a state in which no new image forming job is generated, continues until elapse of a predetermined time after the end of the image forming process. Step S9 is a step in which the MPU 81 executes a waiting determination program Pr5.

The control portion 8 repeats, as appropriate, the process steps from step S1 to step S9 as described above, while the waiting condition is not satisfied. For example, the control portion 8 performs the process steps from step S1 to step S9 each time a predetermined time period elapses. Further, when the control portion 8 determines that the waiting condition is satisfied, the control portion 8 shifts to a waiting state.

As described above, in the sheet feed device of the image forming apparatus 10, the adjustment time variable Ta is changed according to a positional relationship between the extension 234 of the connecting mechanism 23 and the recess 242 of the pickup engagement rotating member 24 which engage with each other with a clearance in the rotation direction.

As a result, although the clearance is provided for the connecting mechanism 23 that transmits power from the drive portion, to the pickup roller 221, variation in time when the recording sheets 9 reach the sheet detection sensor 801 can be prevented. As a result, the recording sheet 9 can be prevented from reaching a position of the sheet detection sensor 801 at time intervals shorter than time intervals at which the sheet detection sensor 801 can perform detection.

Further, in a case where the sheet feeding operation is not the continuous switch feed operation, the control portion 8 does not perform the delay control step. Further, the delay time Td is set only in a very limited case such as a case in which the first one of the recording sheets 9 is fed in the continuous switch feed operation. Therefore, when a plurality of the recording sheets 9 are sequentially fed, the second and the following ones of the recording sheets 9 can be sequentially fed at very short time intervals.

Second Embodiment: Schematic Configuration of Image Forming Apparatus 10A

Figure 11:
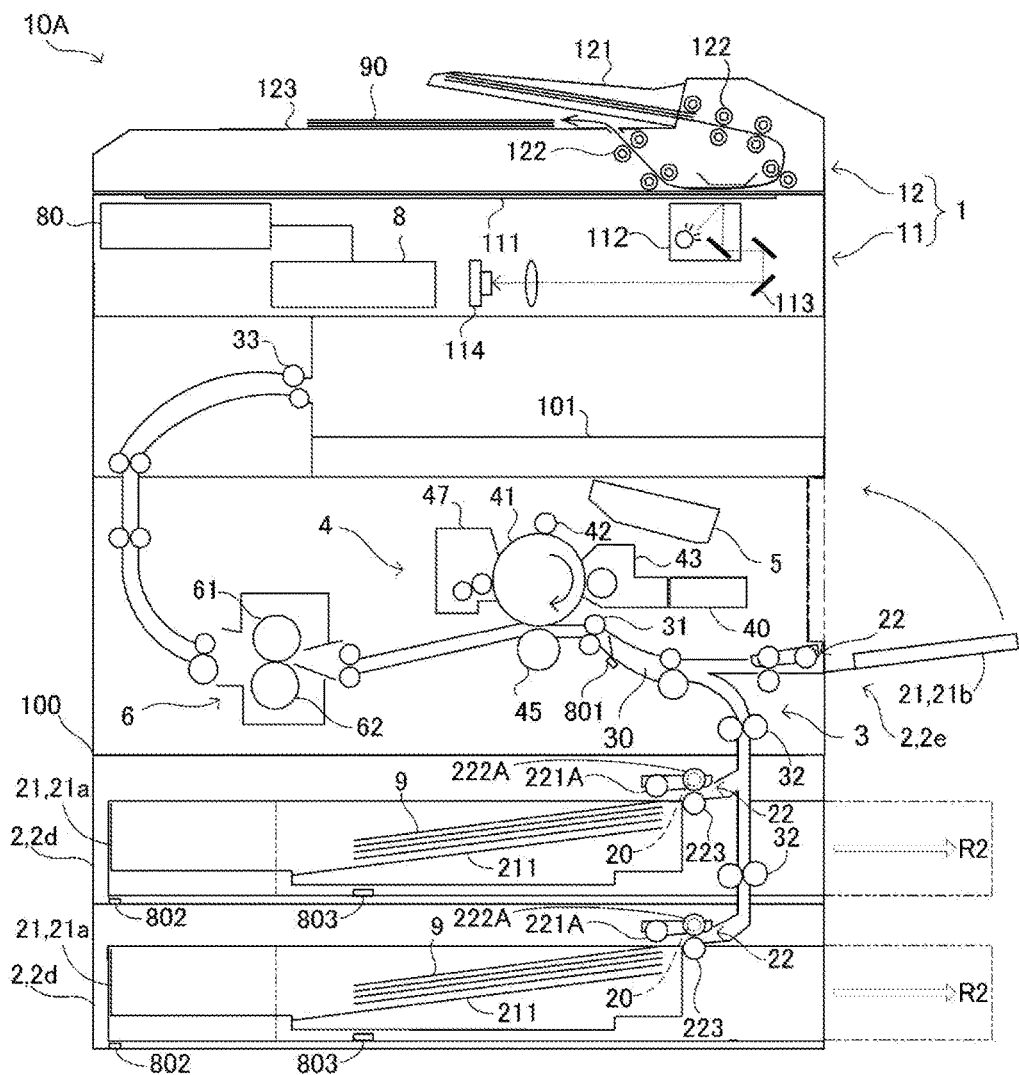
FIG. 11 illustrates a configuration of an image forming apparatus according to a second embodiment of the present disclosure.

An image forming apparatus 10A according to a second embodiment of the present disclosure is an image forming apparatus using electrophotography. As shown in FIG. 11, the image forming apparatus 10A includes the plurality of sheet feeding portions 2, the sheet conveying portion 3, the image forming portion 4, the laser scanning portion 5, the fixing portion 6, the sheet detection sensor 801, and the control portion 8, similarly to the image forming apparatus 10 shown in FIG. 1. Hereinafter, the image forming apparatus 10A will be described, focusing mainly on difference from the image forming apparatus 10. The image forming apparatus 10A further includes a cassette detection sensor 802, a sheet remaining amount sensor 803, and the like.

The image forming apparatus 10A is a multifunction peripheral that includes the document feed reading portion 1 and the operation display portion 80, similarly to the image forming apparatus 10.

Each of the sheet feeding portions 2 includes the sheet receiver 21 and the sheet delivery portion 22. The sheet delivery portion 22 is provided for each sheet receiver 21. FIG. 11 illustrates an exemplary case where the number of the sheet feeding portions 2 provided in the image forming apparatus 10A is three. However, the number of the sheet feeding portions 2 provided in the image forming apparatus 10A may be two, four, or greater than four.

Each sheet delivery portion 22 includes a first sheet feed roller 221A, a second sheet feed roller 222A, and the retard roller 223. The second sheet feed roller 222A is disposed so as to oppose the retard roller 223.

The first sheet feed roller 221A and the second sheet feed roller 222A are each a roller that rotates in contact with the recording sheets 9, to feed the recording sheets 9 from the sheet receiver 21 toward one conveying path 30 in which the sheet detection sensor 801 is provided.

The first sheet feed roller 221A and the second sheet feed roller 222A of the image forming apparatus 10A correspond to the pickup roller 221 and the sheet feed roller 222, respectively, of the image forming apparatus 10.

In the example shown in FIG. 11, two sheet feeding portions among the sheet feeding portions 2 are cassette-type sheet feeding portions 2d. The cassette-type sheet feeding portions 2d each include a sheet cassette 21a and the cassette detection sensor 802, in addition to the sheet delivery portion 22. Further, each cassette-type sheet feeding portion 2d may include the sheet remaining amount sensor 803. The cassette-type sheet feeding portions 2d correspond to the first sheet feeding portion 2a and the second sheet feeding portion 2b of the image forming apparatus 10.

The sheet cassette 21a is mounted so as to be drawable from the housing 100 that forms an exterior portion, and is the sheet receiver 21 that can store a plurality of the recording sheets 9. Hereinafter, a direction in which the sheet cassette 21a is drawn is referred to as a cassette drawing direction R2.

The cassette detection sensor 802 is a sensor that detects whether or not the sheet cassette 21a is mounted in the housing 100. The cassette detection sensor 802 is, for example, a reflective photosensor, a transmission-type photosensor, or a limit switch.

The sheet delivery portion 22 of the cassette-type sheet feeding portion 2d is disposed close to an end portion side, toward the cassette drawing direction R2, of the sheet cassette 21a mounted in the housing 100. The sheet delivery portion 22 (the first sheet feed roller 221A and the second sheet feed roller 222A) feeds the recording sheets 9 stored in the sheet cassette 21a diagonally upward in the cassette drawing direction R2.

The sheet remaining amount sensor 803 is a sensor that detects a remaining amount of the recording sheets 9 in the sheet cassette 21a. For example, the sheet remaining amount sensor 803 is a reflective optical sensor that applies light to a lower surface of a placement plate 211 on which the recording sheets 9 are placed. The placement plate 211 is tilted such that the less the remaining amount of the recording sheets 9 is, the greater the tilt angle of the placement plate 211 is. The optical sensor (the sheet remaining amount sensor 803) outputs a detection signal that varies according to the tilt angle of the placement plate 211.

For example, the control portion 8 identifies a remaining amount of the recording sheets 9 at plural stages such as 25%, 50%, 75%, and 100% according to a level of the detection signal from the sheet remaining amount sensor 803.

The remaining one among the three sheet feeding portions 2 is a manual sheet feeding portion 2e. The manual sheet feeding portion 2e includes a manual sheet feed tray 21b, and the manual sheet feed tray 21b is the sheet receiver 21 that can be folded into the housing 100. The manual sheet feeding portion 2e corresponds to the third sheet feeding portion 2c of the image forming apparatus 10.

Each of the feed clutches 20 is a clutch that selectively switches between a connecting state and a release state according to an inputted control signal. The connecting state is a state where power (rotational force) is transmitted from a drive portion, such as a gear, driven by a motor to the first sheet feed roller 221A and the second sheet feed roller 222A, and the release state is a state where the transmission state is released. Each feed clutch 20 transmits the power through a not-illustrated connecting mechanism, from the drive portion, to the first sheet feed roller 221A and the second sheet feed roller 222A.

A portion, of the image forming apparatus 10A, including the plurality of sheet feeding portions 2 and the control portion 8 corresponds to a sheet feed device of the second embodiment.

Also in the image forming apparatus 10A, the sheet conveying portion 3 includes the registration roller 31, the conveying roller 32, the discharge roller 33, and the like.

Figure 12:
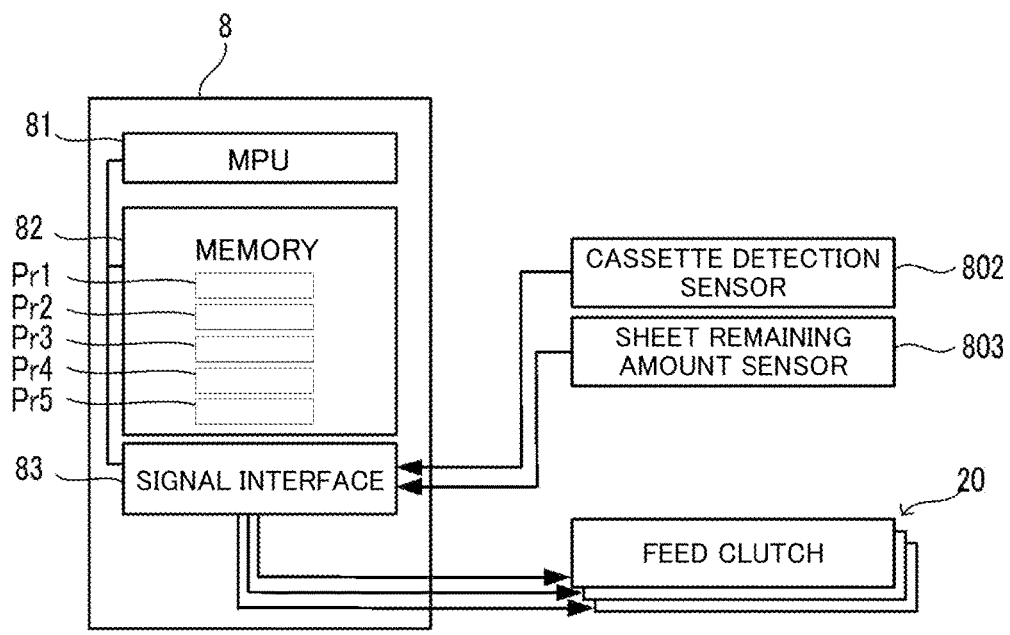
FIG. 12 is a block diagram illustrating devices associated with a sheet feed control in the image forming apparatus according to the second embodiment.

As shown in FIG. 12, the control portion 8 of the image forming apparatus 10A also includes the MPU 81, the memory 82, and the signal interface 83.

As described above, in the sheet feed device of the image forming apparatus 10A, the first sheet feed roller 221A and the second sheet feed roller 222A are disposed close to the end portion side, toward the cassette drawing direction R2, of the sheet cassette 21a mounted in the housing 100. In this case, when the sheet cassette 21a is mounted in the housing 100, the upper surface of the recording sheets 9 contacts with the first sheet feed roller 221A, and the recording sheet 9 may deviate from its correct position toward a position on the downstream side in the sheet feeding direction.

Therefore, if the control portion 8 starts feeding each recording sheet 9 at a fixed timing based on occurrence of a feed start event for each recording sheet 9, a time when the recording sheet 9 from the sheet cassette 21a reaches the sheet detection sensor 801 may vary. That is, in a case where the position of the recording sheet 9 deviates, the recording sheet 9 reaches the position of the sheet detection sensor 801 earlier than in a case where the position of the recording sheet 9 does not deviate.

Further, for example, in a case where the variation in time due to the deviation in position of the recording sheet 9 occurs only under a specific condition, even when intervals at which the recording sheets 9 are fed are adjusted according to an actual value of a time when the recording sheet 9 is conveyed, occurrence of the variation cannot be prevented.

On the other hand, in the sheet feed device of the present embodiment, the control portion 8 performs a control described below. Thus, in a case where the sheet cassette 21a which is drawable, is mounted in the housing 100, even when a position of the recording sheet 9 deviates, the recording sheets 9 can be sequentially fed at very short time intervals while occurrence of the variation in time can be prevented.

[Method for Controlling Sheet Feed Device]

Figure 13:
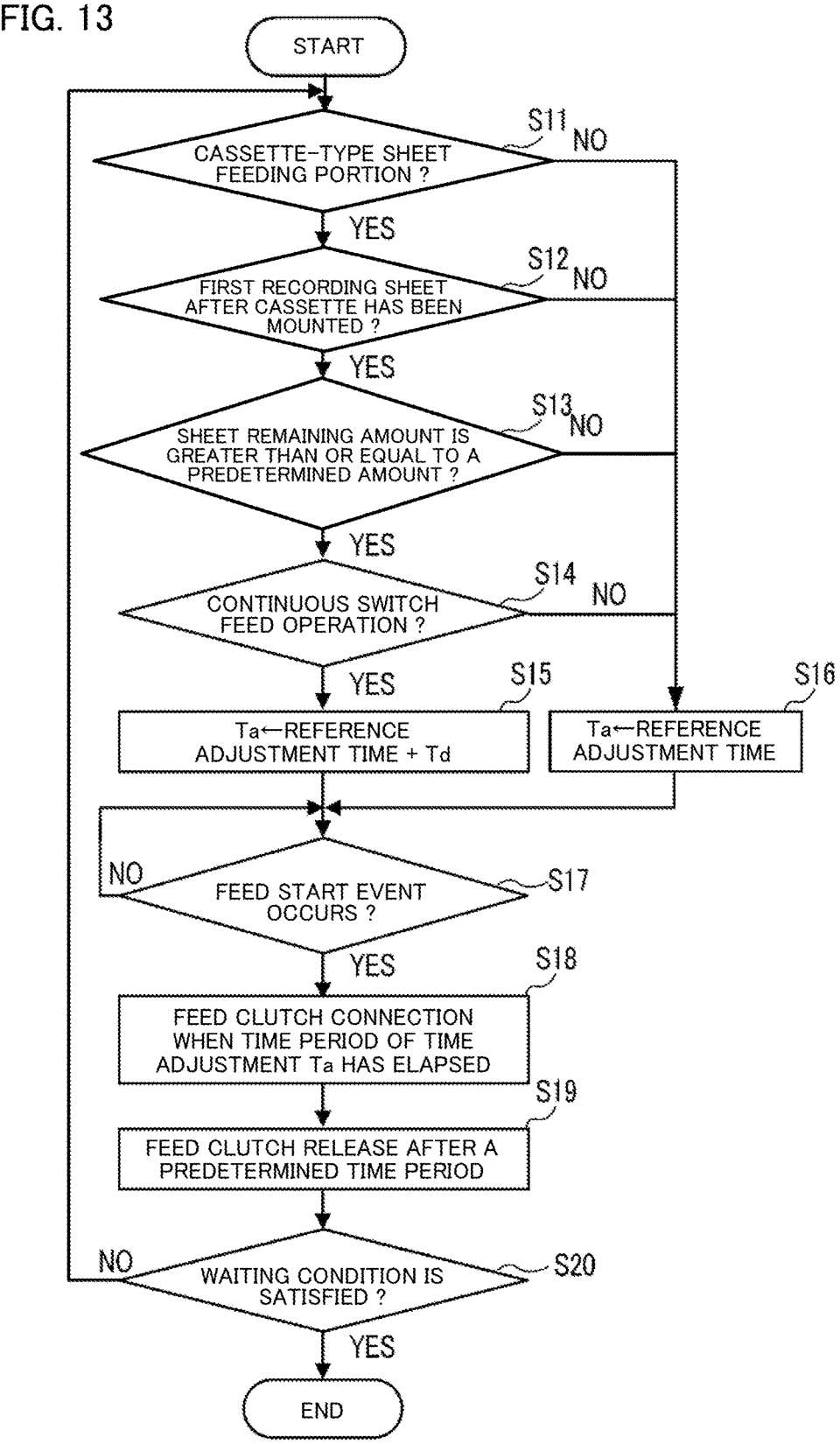
FIG. 13 is a flow chart showing an example of a procedure of the sheet feed control performed by a control portion of the image forming apparatus according to the second embodiment.

Subsequently, an example of a control step, for the sheet feeding portion 2, performed by the control portion 8 in the sheet feed device of the image forming apparatus 10A will be described with reference to FIG. 13. FIG. 13 is a flow chart showing an example of a procedure of a sheet feeding control process performed by the control portion 8.

The control step is a process step in which the control portion 8 causes each feed clutch 20 to perform the sheet feeding operation for feeding the recording sheet 9 from the sheet receiver 21 to the sheet delivery portion 22. The control portion 8 outputs the control signal at a timing based on the feed start event that occurs each time one of the recording sheets 9 is to be fed.

When, for example, a job for forming an image by the image forming portion 4 is generated, the control portion 8 starts the control step shown in FIG. 13. In the following description, S11, S12, . . . represent specific numbers of the process steps, respectively. The process by the control portion 8 as described below, is performed by the MPU 81 executing the control programs stored in the memory 82.

<Step S11>

Firstly, the control portion 8 identifies, with reference to contents of the job, the sheet feeding portion 2, among the plurality of the sheet feeding portions 2, for which the sheet feeding operation will be started. At this time, the control portion 8 determines whether or not the sheet feeding portion 2 having been identified, is the cassette-type sheet feeding portion 2d.

When the sheet feeding operation is to be performed for the cassette-type sheet feeding portion 2d, the control portion 8 advances the process to steps S12 to S14 in which the process steps described below are performed. On the other hand, when the sheet feeding operation is not to be performed for the cassette-type sheet feeding portion 2d, the control portion 8 advances the process to step S16 in which the process step described below is performed.

<Step S12>

In step S12, the control portion 8 determines whether the cassette-type sheet feeding portion 2d to be controlled has never performed the sheet feeding operation after the cassette detection sensor 802 has most recently detected that the sheet cassette 21a is mounted.

That is, the control portion 8 determines whether or not the sheet feeding operation that will be started for the cassette-type sheet feeding portion 2d to be controlled is an operation for feeding a first one of the recording sheets 9 after it has been most recently detected that the sheet cassette 21a is mounted (S12).

In a case where the sheet cassette 21a is mounted in the housing 100, when the upper surface of the recording sheets 9 contacts with the first sheet feed roller 221A, the uppermost one of the recording sheets 9 may deviate from its correct position toward a position on the downstream side in the sheet feeding direction. Therefore, step S12 is a step in which whether or not the recording sheet 9 that will be fed is a sheet that is likely to deviate in position, is determined.

<Step S13>

Further, in step S13, the control portion 8 determines whether or not the sheet remaining amount sensor 803 detects a remaining amount that is greater than or equal to a predetermined amount. The predetermined amount represents, for example, 100% or an amount close to 100%.

In general, unless a maximum amount of the recording sheets 9 or almost a maximum amount thereof is stored in the sheet cassette 21a, a phenomenon that the upper surface of the recording sheets 9 contacts with the first sheet feed roller 221A when the sheet cassette 21a is mounted in the housing 100, does not occur. Therefore, step S13 is a step in which whether or not the recording sheet 9 is likely to deviate from its correct position toward a position on the downstream side in the sheet feeding direction, is determined.

<Step S14>

Further, the control portion 8 determines whether or not the sheet feeding operation that will be performed by the cassette-type sheet feeding portion 2d is a continuous switch feed operation that satisfies a predetermined condition. Steps S11 to S14 correspond to steps in which the MPU 81 executes the operation determination program Pr1 (determination step).

When the sheet feeding operation that will be performed by the cassette-type sheet feeding portion 2d having been identified in step S11 is a continuous operation that continues from the sheet feeding operation by another one of the sheet feeding portions 2, the control portion 8 determines that the continuous switch feed operation is performed. The continuous operation is an operation in which, in a very short predetermined time period from the end of the sheet feeding operation by one of the sheet feeding portions 2, the sheet feeding operation by a different one of the sheet feeding portions 2 is started.

For example, in a case where the job for forming an image is a job involving an automatic change control for the sheet feeding portion 2, the sheet feeding operation is determined as the continuous switch feed operation. The automatic change control is a control for sequentially feeding a plurality of the recording sheets 9 while automatically selecting, according to a predetermined selection rule, the sheet feeding portion 2 for which the sheet feeding operation is to be performed. In this case, in a series of the automatic change control, the sheet feeding operation by the sheet feeding portion 2 which has been selected for the second or the following time, is the continuous switch feed operation.

For example, the automatic change control is a control in which, in a case where it is determined that the recording sheet 9 in the sheet receiver 21 for the sheet feeding portion 2 that has been selected first, becomes absent during the job (sheet remaining amount: 0%), another one of the sheet feeding portions 2 is automatically selected to continue the job.

Further, in a case where a plurality of the documents 90 having different sizes are set in the document placement portion 121 of the ADF 12, the automatic change control may be performed. In this case, the control portion 8 detects a size of each of the documents 90 that are sequentially fed by the ADF 12, according to image data of the documents 90 obtained by the image reading portion 11. The sheet delivery portion 22 of the sheet feeding portion 2 in which the recording sheets 9 having a size corresponding to the size of the document 90 having been detected are set, is selected, as a subject for which the sheet feeding operation is to be performed, by the control portion 8.

Further, also in a case where, while the recording sheets 9 from one of the sheet feeding portions 2 are being sequentially fed for a certain image forming job, a new image forming job using another one of the sheet feeding portions 2 is generated, the sheet feeding operation for the new image forming job is the continuous switch feed operation.

<Step S15>

In a case where determination conditions of steps S11 to S14 are all satisfied, the control portion 8 sets, as the adjustment time variable Ta to be used for a control described below, a value representing a time that is longer than a predetermined reference adjustment time by a predetermined delay time Td. Step S15 is a step in which the MPU 81 executes the delay control program Pr2.

A case where the determination conditions of steps S11 to S14 are all satisfied, is a case where the sheet feeding operation that will be performed is an operation for feeding a first one of the recording sheets 9 after the sheet cassette 21a is mounted in the cassette-type sheet feeding portion 2d (YES in S12), and a remaining amount of the recording sheets 9 is greater than or equal to the predetermined remaining amount (YES in S13), and the sheet feeding operation that will be performed is the continuous switch feed operation (YES in S14).

The state where step S15 is to be performed, is a state where the recording sheet 9 is likely to deviate toward a position on the downstream side in the sheet feeding direction at the start of the sheet feeding operation.

The reference adjustment time is predefined for each sheet feeding portion 2. Further, the delay time Td is a time required for feeding the recording sheet 9 over a length corresponding to an estimated maximum deviation in position of the recording sheet 9.

<Step S16>

On the other hand, in a case where one of the determination conditions of steps S11 to S14 is not satisfied, the control portion 8 sets, as the adjustment time variable Ta, a value representing the reference adjustment time. Step S16 is a step in which the MPU 81 executes the non-delay control program Pr3.

<Steps S17 to S19>

The control portion 8 monitors occurrence of the feed start event (S17). Further, the control portion 8 causes the feed clutch 20 for the sheet delivery portion 22 having been identified in step S11 to enter the connecting state when a time represented by the adjustment time variable Ta has elapsed after occurrence of the feed start event (S18). Further, the control portion 8 returns the feed clutch to the release state after elapse of a predetermined time period (S19). The control portion 8 outputs the control signal to the feed clutch 20, to cause the feed clutch 20 to be in the connecting state or the release state.

The feed start event is, for example, an event that a control signal for causing a clutch (not shown) of the registration roller 31 to be in a connecting state (ON state) becomes active (ON).

Each time the control portion 8 performs steps S17 to S19, one of the recording sheets 9 is fed from the sheet receiver 21 toward the conveying path 30. Steps S17 to S19 are steps in which the MPU 81 executes the clutch control signal output program Pr4.

The process steps of steps S11 to S12 performed by the control portion 8 represent a process step including the determination step. The determination step is a process step in which it is determined, when the control portion 8 causes the cassette-type sheet feeding portion 2d to perform the sheet feeding operation, whether or not the sheet feeding operation is a first feeding operation for feeding a first one of the recording sheets after the cassette detection sensor 802 of the cassette-type sheet feeding portion 2d detects that the sheet cassette 21a is mounted.

Further, the process steps of steps S15 to S19 performed by the control portion 8 represent an example of the delay control step. The delay control step is a process step in which, in a case where the result of the determination step represents the first feeding operation as described above, output timing of the control signal for feeding the first one of the recording sheets 9 by the cassette-type sheet feeding portion 2d is delayed as compared to output timing of the control signals for feeding the second and the following ones of the recording sheets 9, subsequent to the first one of the recording sheets 9, by the same cassette-type sheet feeding portion 2d.

<Step S20>

Next, the control portion 8 determines whether or not a predetermined waiting condition is satisfied. The waiting condition is, for example, a condition in which a state in which no new image forming job is generated, continues until elapse of a predetermined time after the end of the image forming process. Step S20 is a step in which the MPU 81 executes the waiting determination program Pr5.

The control portion 8 repeats, as appropriate, the process steps from step S11 to step S20 as described above, while the waiting condition is not satisfied. For example, the control portion 8 performs the process steps from step S11 to step S20 each time a predetermined time period elapses. Further, when the control portion 8 determines that the waiting condition is satisfied, the control portion 8 shifts to the waiting state.

As described above, in the sheet feed device of the image forming apparatus 10A, the adjustment time variable Ta is changed according to at least whether or not the sheet feeding operation is the first feeding operation for feeding a first one of the recording sheets 9 after the sheet cassette 21a is mounted.

As a result, even in a case where deviation in position of the recording sheet 9 placed at the uppermost position occurs when the sheet cassette 21a is mounted in the housing 100, variation in time when the recording sheet 9 reaches the sheet detection sensor 801 can be prevented. As a result, the recording sheet 9 can be prevented from reaching a position of the sheet detection sensor 801 at time intervals shorter than time intervals at which the sheet detection sensor 801 can perform detection.

Further, the delay time Td is set by the control portion 8 only in a very limited case such as a case where the sheet feeding operation by the cassette-type sheet feeding portion 2d is the first feeding operation as described above. Therefore, in a case where a plurality of the recording sheets 9 are sequentially fed, the second and the following ones of the recording sheets 9 can be sequentially fed at very short time intervals.

Further, the control portion 8 performs determination as to one or both of the conditions of step S13 and step S14 in addition to the conditions of steps S11 and S12, whereby the delay control is performed only when the recording sheet 9 is more likely to deviate in position. As a result, the recording sheets 9 can be more frequently fed at short time intervals.

For example, since the control portion 8 performs determination as to the condition of step S13, only when the sheet remaining amount sensor 803 detects a remaining amount that is greater than or equal to the predetermined amount, the delay control step is performed.

Further, the control portion 8 performs determination as to the condition of step S14. Therefore, in a case where the control portion 8 causes the cassette-type sheet feeding portion 2d to perform the sheet feeding operation, only when the sheet feeding operation is an operation that continues from the sheet feeding operation by another one of the sheet feeding portions 2, the control portion 8 performs the delay control step. In this case, the control portion 8 may perform the delay control step when the automatic change control is performed.

Other Application Examples

The procedure of the control step shown in FIG. 10 is an example. The control step may be performed in another procedure. For example, step S2 and step S3 may be performed in reverse order.

Similarly, the procedure of the control step shown in FIG. 13 is an example. The control step may be performed in another procedure. For example, steps S11 to S14 may be performed in another order, or one or both of steps S13 and S14 may be omitted.

The sheet feed device, the image forming apparatus, and the method for controlling the sheet feed device according to the present disclosure can be implemented by optionally combining the embodiments and/or the application examples as described above, or by modifying or partially omitting the embodiments and/or the application examples as appropriate.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising a sheet feed device and an image forming portion, the sheet feed device including:

a plurality of sheet receivers on each of which a plurality of recording sheets can be stacked and placed;

a plurality of sheet delivery portions provided for the sheet receivers, respectively, each sheet delivery portion including: a pickup roller that is pressed against the recording sheets and rotates, to feed each recording sheet from a corresponding one of the sheet receivers; a pickup engagement rotating member that is rotatably supported and engages with the pickup roller; a connecting mechanism that engages with the pickup engagement rotating member with a clearance in a rotation direction thereof; and a feed clutch that selectively switches between a state where power is transmitted from a drive portion to the connecting mechanism, and a state where the transmission state is released, according to an inputted control signal, the plurality of sheet delivery portions configured to feed the recording sheets from the sheet receivers toward one conveying path in which a sensor that detects the recording sheets is provided; and a control portion configured to output the control signal to one of the feed clutches at a timing based on occurrence of a feed start event for each recording sheet, to cause a corresponding one of the sheet delivery portions to perform a sheet feeding operation for feeding the recording sheets from a corresponding one of the sheet receivers, wherein in a case where the control portion causes one of the sheet delivery portions to perform the sheet feeding operation, when an automatic change control for sequentially feeding the plurality of recording sheets while automatically selecting, according to a predetermined selection rule, the sheet delivery portion for which the sheet feeding operation is to be performed, is performed, the control portion performs a delay control in which output timing of the control signal for feeding a first one of the recording sheets from the sheet delivery portion is delayed by a predetermined time period as compared to output timing of the control signals for feeding a second and the following ones of the recording sheets, subsequent to the first one of the recording sheets, from the same sheet delivery portion, the predetermined time period being a time period required for a part of one of the connecting mechanisms that engages with the corresponding pickup engagement rotating member to rotate over a distance corresponding to the clearance, and the image forming portion forms an image on the recording sheets fed from the sheet delivery portions of the sheet feed device.

2. The image forming apparatus according to claim 1, wherein each of the sheet delivery portions further includes a sheet feed roller that further feeds each recording sheet fed from the respective pickup roller, toward the conveying path, while nipping the recording sheet between the sheet feed roller and a retard roller having an outer peripheral surface formed of an elastic material, and each connecting mechanism transmits power from the respective feed clutch to the respective sheet feed roller and the respective pickup engagement rotating member.

3. A method for controlling a sheet feed device comprising: a plurality of sheet receivers on each of which a plurality of recording sheets can be stacked and placed; and a plurality of sheet delivery portions provided for the sheet receivers, respectively, each sheet delivery portion including: a pickup roller that is pressed against the recording sheets and rotates, to feed each recording sheet from a corresponding one of the sheet receivers; a pickup engagement rotating member that is rotatably supported and engages with the pickup roller; a connecting mechanism that engages with the pickup engagement rotating member with a clearance in a rotation direction thereof; and a feed clutch that selectively switches between a state where power is transmitted from a drive portion to the connecting mechanism, and a state where the transmission state is released, according to an inputted control signal, the plurality of sheet delivery portions configured to feed the recording sheets from the sheet receivers toward one conveying path in which a sensor that detects the recording sheets is provided, the method comprising:

a control step, performed by a control portion, of outputting the control signal to one of the feed clutches at a timing based on occurrence of a feed start event for each recording sheet, to cause a corresponding one of the sheet delivery portions to perform a sheet feeding operation for feeding the recording sheets from a corresponding one of the sheet receivers, wherein the control step includes:

a determination step of determining, when the one sheet delivery portion is caused to perform the sheet feeding operation, whether or not the sheet feeding operation is an automatic change operation for sequentially feeding the plurality of recording sheets while automatically selecting, according to a predetermined selection rule, the sheet delivery portion for which the sheet feeding operation is to be performed; and a delay control step of delaying by a predetermined time period, when a result of the determination step represents the automatic change operation, output timing of the control signal for feeding a first one of the recording sheets from the one sheet delivery portion, as compared to output timing of the control signals for feeding a second and the following ones of the recording sheets, subsequent to the first one of the recording sheets, from the same sheet delivery portion, the predetermined time period being a time period required for a part of one of the connecting mechanisms that engages with the corresponding pickup engagement rotating member to rotate over a distance corresponding to the clearance.

4. A sheet feed device comprising:

a plurality of sheet receivers on each of which a plurality of recording sheets can be stacked and placed;

a plurality of sheet delivery portions provided for the sheet receivers, respectively, each sheet delivery portion including: a pickup roller that is pressed against the recording sheets and rotates, to feed each recording sheet from a corresponding one of the sheet receivers; a pickup engagement rotating member that is rotatably supported and engages with the pickup roller; a connecting mechanism that engages with the pickup engagement rotating member with a clearance in a rotation direction thereof; and a feed clutch that selectively switches between a state where power is transmitted from a drive portion to the connecting mechanism, and a state where the transmission state is released, according to an inputted control signal, the plurality of sheet delivery portions configured to feed the recording sheets from the sheet receivers toward one conveying path in which a sensor that detects the recording sheets is provided; and a control portion configured to output the control signal to one of the feed clutches at a timing based on occurrence of a feed start event for each recording sheet, to cause a corresponding one of the sheet delivery portions to perform a sheet feeding operation for feeding the recording sheets from a corresponding one of the sheet receivers, wherein in a case where the control portion causes one of the sheet delivery portions to perform the sheet feeding operation, when an automatic change control for sequentially feeding the plurality of recording sheets while automatically selecting, according to a predetermined selection rule, the sheet delivery portion for which the sheet feeding operation is to be performed, is performed, the control portion performs a delay control in which output timing of the control signal for feeding a first one of the recording sheets from the sheet delivery portion is delayed by a predetermined time period as compared to output timing of the control signals for feeding a second and the following ones of the recording sheets, subsequent to the first one of the recording sheets, from the same sheet delivery portion, the predetermined time period being a time period required for a part of one of the connecting mechanisms that engages with the corresponding pickup engagement rotating member to rotate over a distance corresponding to the clearance.

* * * * *